Patented May 23, 1933

1,910,142

UNITED STATES PATENT OFFICE

ERNEST E. WEMP, OF DETROIT, MICHIGAN

CLUTCH CONSTRUCTION

Application filed October 22, 1930. Serial No. 490,523.

This invention relates to clutch construction useful in automotive vehicles. The invention is directed to the provision of a clutch wherein a free wheeling action or direct engine connection action may be had at the will of the operator. As is understood by those skilled in the art, free wheeling is that action wherein the engine of the automotive vehicle may be decelerated while the vehicle coasts or glides along, overrunning the engine. The term "direct engine connection" as used above means a more positive connection between the engine and vehicle so that they decelerate together substantially uniformly. In conjunction with this a fluid or hydraulic driving clutch is employed. In fact, the construction embodies a primary clutch which is the fluid or hydraulic clutch and a secondary clutch effective to cut out or render ineffective a mechanism which provides for the overrunning or free wheeling action.

In the accompanying drawings:

Fig. 3 is a detail of the clutch pedal.

Figure 1:
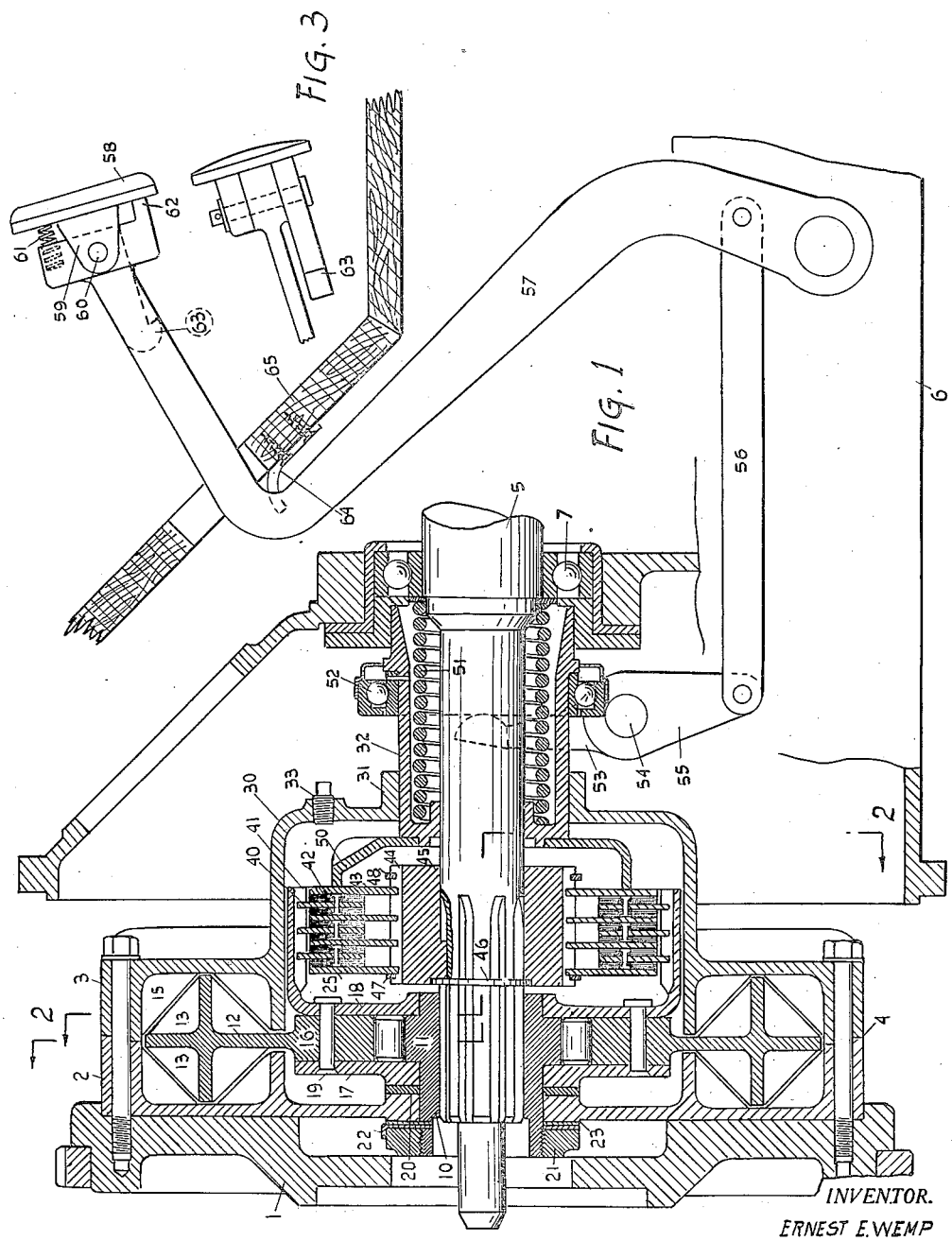
Fig. 1 is a sectional view taken through a clutch constructed in accordance with the invention.

The fly wheel of the usual internal combustion engine is illustrated at 1 and mounted on this fly wheel is an impeller of a fluid clutch. This impeller may consist of an inner member 2 and an outer member 3 fitting each other as at 4 and bolted to the fly wheel as shown. The fly wheel and the impeller constitute the driving parts.

A driven shaft is shown at 5 and this may be the usual main driven shaft extending into the transmission housing 6 journaled in a bearing 7. Mounted upon this driven shaft by means of the usual spline connection is a hub 10 provided with a rib or annular flange 11.

This hub supports a rotor. This rotor is generally illustrated at 12 and it has circumferentially spaced wings 13 which define chambers 14, and a portion of the rotor is located in a circumferential chamber defined with the parts 2 and 3 of the impeller. The parts 2 and 3 have circumferentially spaced wings or partitions 15 which define spaced chambers 16. This impeller and rotor construction is merely exemplary of a fluid clutch. The rotor and impeller are relatively rotatable but when filled with a fluid such as oil the same becomes more or less trapped in the chambers between the wings or partitions and the propeller drives the rotor. It is appreciated that this clutch may not be 100% efficient as there is a slippage between the rotor and impeller.

The rotor has a portion 16 in radial alignment with the rib 11 and forms a spaced element between two parts 17 and 18, the three being connected as by means of rivets 19. The parts 17 and 18 overlap the rib and are rotatable upon the hub. The impeller part 12 also fits over the hub as shown and is rotatable thereon, and between the adjacent parts of the impeller and rotor on the hub there may be a bearing 20 of suitable metal such as bronze or the like. The assembly is maintained as by means of a nut 21 screwed onto the end of the hub 10 and held by a lock washer 22, while between the lock washer and adjacent part of the impeller there is preferably another bearing 23 of suitable metal such as bronze or the like.

Figure 2:
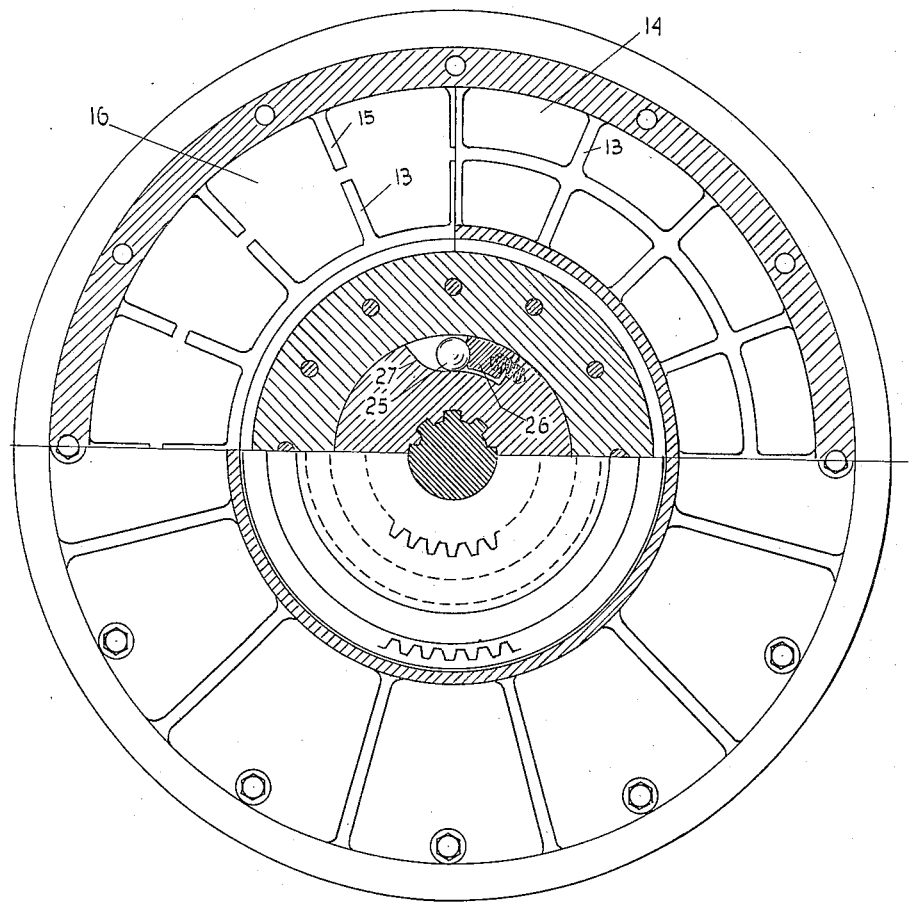
Fig. 2 is a composite sectional view on lines 2—2 of Fig. 1.

The rotor is associated with the hub through the means of an overrunning clutch consisting of rollers 25. These rollers may be mounted in grooves in the hub and each is backed up by a spring-pressed plunger 26. As Fig. 2 is viewed, assume that the rotor moves counter-clockwise; each roller is jammed against the inclined face 27 to drive the hub. The hub may overrun the rotor however, in which action the inclined face 27 moves away from the roller. Any number of rollers may be provided between the hub and rotor. The impeller part 3 may have a rear portion 30 which substantially closes as at 31 against the sleeve 32 and the impeller which is constituted by the two co-operating parts 2 and 3 takes the shape of a housing which may be substantially filled with oil as by means of a plugged closure 33.

The operation of the parts as thus far described is as follows: with the fly wheel rotating, the impeller rotates with it and this, through the fluid clutch, effects rotation of the rotor. The rotor in turn through the overrunning clutch constituted by the rollers 25, drives the shaft 5. Should the engine be decelerated, the shaft 5 may continue rotating at substantially the same speed, thus overrunning the rotor. In this manner the engine of a vehicle may be decelerating while the car coasts along the road. This is the free wheeling action. Inasmuch as the fluid clutch is not perfectly efficient, a slippage results between the rotor and impeller. This slippage is not thought to be such as to materially impair the operation, as the higher the speed, the less the ratio of slippage. In other words, the faster the parts operate the more efficient the clutch becomes. At low speeds, however, the slippage may be so great as to effect no substantial rotation of the rotor at all. Thus the clutch is in a way automatic for the engine may be idled at a slow speed without driving the shaft 5. When the engine is accelerated the clutch becomes effective.

A secondary clutch is provided for eliminating or rendering ineffective the overrunning clutch constituted by the rollers 25. This may take the form of a multiple disc clutch having driving discs 40 having a tooth engagement, as at 41, with the member 18 and these driving discs preferably having clutch facing material secured thereto as at 42. Driven discs 43 have tooth engagement, as at 44, with a hub 45 which may be splined to the driven shaft. A ring or shoulder 46 on the driven shaft locates the hub 45 while the driven discs are held assembled on the hub by suitable rings 47 and 48. A pressure plate 50 is mounted upon the sleeve 32 and within this sleeve is a packing spring 51 backed up by the bearing 7. When the spring 51 is free to expand the sleeve 32 is shifted to the left, as Fig. 1 is viewed, and the discs 40, 43 are packed together and the end pressure resisted by ring 46. When this secondary clutch is engaged, it will be noted that the rotor drives the shaft 5 through the secondary clutch and that the driven shaft 5 does not overrun the rotor.

To release the secondary clutch there is a bearing 52 acted upon by forked members 53 mounted upon rock shaft 54 having an arm 55 connected with an operating foot lever 57 by link 56. This foot lever has a pad 58 with ears 59 pivotally mounted to the lever as at 60. The pad is spring pressed by spring 61 against an abutment 62 which is its normal position while one of its ears has a hook 63 which advantageously lies within the confines of the sides of the lever in normal position. This hook is arranged to be engaged behind a catch which may be in the form of a plate 64 held in position as by means of being fastened to floor boards 65.

Accordingly, it will be noted that any time the lever is depressed, the secondary clutch is released, and when the lever is allowed to return the secondary clutch becomes engaged. The lever 56 may be held depressed thus holding the secondary clutch disengaged by catching the hook 63 on the catch 64. This is accomplished by the operator rocking the pad 58 against action of spring 61 in such manner as to engage the hook with the catch. This holds the secondary clutch released. To re-engage it, the pad need but be tripped.

As set forth above, the operation may be performed entirely through the fluid clutch and at this time the secondary clutch is held released. Shifting the gears is possible by reason of the overrunning clutch between the rotor and driven shaft and also because of slippage in the fluid clutch. If at any time the operator of his own desire or of necessity wants to utilize the vehicle engine as a decelerating agency, the pad 58 is merely tripped to engage the secondary clutch thus rendering ineffective the free wheeling action. If any operator so desires, he may use the secondary clutch at all times. In this case gear shifting is performed in a manner like the conventional automotive vehicle of today which consists in depressing the clutch pedal while shifting gears and then releasing the clutch pedal. The secondary clutch is also useful in the event it is necessary to push or tow the car to start the engine. This cannot be done through the rollers 25 because the shaft 5 would merely overrun the rotor but it can be done with the secondary clutch engaged.

The secondary clutch may be of the multiple disc type as shown or of the single disc type. The inertia of the shaft 5 and its associated parts, namely, the hubs 10 and 45 and driven discs 43 is relatively low due to the fact that all these parts are located close to the axial center of the shaft and this facilitates gear shifting. It is contemplated that the clutch will be operated much of the time with the secondary clutch disengaged and for this reason it has been preferred to take the end thrust of the compressed spring 51 by anti-friction bearings as shown, both of which are preferably adequately lubricated.

I claim:

1. In a clutch, the combination of a driving and a driven member in which the driving member actuates the driven member with permanent connection through fluid means, a driven shaft and an overrunning connection directly between the driven shaft and the driven member.

2. In a clutch, the combination of a driving and a driven member associated with each other through fluid means, a driven shaft, an overrunning connection between the driven member and driven shaft, and other means for connecting and disconnecting at will the driven member and driven shaft.

3. In a clutch, the combination of a driving and a driven member associated with each other through fluid means, a driven shaft, an overrunning connection between the driven member and driven shaft, and a clutch for connecting the driven member to the driven shaft independently of the overrunning connection.

4. In a clutch, the combination of a driving and a driven member associated with each other through fluid means, a driven shaft, an overrunning connection between the driven member and driven shaft, a clutch for connecting the driven member to the driven shaft independently of the overrunning connection, and means for controlling the engagement and disengagement of the clutch at will.

5. In a clutch, the combination of an impeller, a rotor actuated by the impeller through fluid means, a driven shaft, an overrunning clutch between the driven shaft and the rotor which permits of the driven shaft to overrun the rotor, and friction means for establishing connection between the rotor and driven shaft to render the overrunning clutch ineffective.

6. The combination of a driving member and a driven member in substantially permanent operating association and relying upon a relatively high R. P. M. for the driving member to drive the driven member, a driven shaft, an overrunning connection between the driven member and driven shaft, and separate clutch means for establishing a direct connection between the driven member and driven shaft to render the overrunning connection ineffective.

7. The combination of a driving member and a driven member in substantially permanent operating association and relying upon a relatively high R. P. M. for the driving member to drive the driven member, a driven shaft, an overrunning connection between the driven member and driven shaft, separate clutch means for establishing a direct connection between the driven member and driven shaft to render the overrunning connection ineffective, and means for controlling engagement and disengagement of the clutch means.

8. The combination with an engine fly wheel or the like, an impeller connected to the fly wheel of housing formation for containing a fluid, a rotor in the housing adapted to be actuated by the impeller through the fluid, a driven shaft on the axial center of the rotor and carrying the rotor, and an overrunning connection between the rotor and driven shaft.

9. The combination with an engine fly wheel or the like, an impeller connected to the fly wheel of housing formation for containing a fluid, a rotor in the housing adapted to be actuated by the impeller through the fluid, a driven shaft, an overrunning connection between the rotor and driven shaft, and separate clutch means for establishing a connection between the rotor and driven shaft independently of the overrunning clutch.

10. The combination with an engine fly wheel, a driven shaft on the axial center of the fly wheel, an impeller and a rotor associated, respectively, with the fly wheel and driven shaft and in which the impeller actuates the rotor by fluid means, said driven shaft supporting the rotor, and an overrunning clutch between the rotor and driven shaft.

11. The combination of a fly wheel or the like, a driven shaft on the axial center of the fly wheel, an impeller in the form of a housing attached to the fly wheel, said housing adapted to contain a fluid, means associating the driven shaft and impeller to seal the fluid, a rotor within the housing and carried by the driven shaft, and an overrunning clutch directly between the rotor and driven shaft.

12. The combination of a fly wheel or the like, a driven shaft, an impeller in the form of a housing attached to the fly wheel, said housing adapted to contain a fluid, means associating the driven shaft and impeller to seal the fluid means, a rotor within the housing and carried by the driven shaft, an overrunning clutch between the rotor and driven shaft, and a friction clutch within the housing controllable at will and establishing a direct connection between the rotor and driven shaft whereby to render the overrunning clutch ineffective.

13. The combination of a driving fly wheel, a driven shaft, a hub secured to the driven shaft, a housing like impeller secured to the fly wheel and journaled on said hub, a rotor carried by the hub and rotatable with respect thereto, an overrunning clutch between the rotor and hub, and another clutch controllable at will for establishing a connection between the rotor and driven shaft independently of the overrunning clutch.

14. A clutch adapted for use in an automotive vehicle comprising in combination with a fly wheel and a driven shaft, a primary clutch having an impeller and rotor associated respectively with the fly wheel and driven shaft, an overrunning clutch between the rotor and driven shaft, and a secondary clutch for establishing a non-overrunning connection between the rotor and driven shaft.

15. A clutch adapted for use in an automotive vehicle comprising in combination with a fly wheel and a driven shaft, a primary clutch having an impeller and rotor associated respectively with the fly wheel and driven shaft, an overrunning clutch between the rotor and driven shaft, a secondary clutch for establishing a non-overrunning connection between the rotor and driven shaft, and means for holding the secondary clutch disengaged.

16. The combination of a driving fluid clutch impeller, a driven rotor, a driven shaft, a one-way drive connection between the driven shaft and rotor, said impeller and shaft being permanently connected together through said rotor and one-way drive connection, the impeller and rotor being arranged so that the impeller actuates the rotor only upon relatively high R. P. M., and a clutch operable at will for connecting the driven shaft and rotor for eliminating the one-way drive action.

17. The combination of a driving fluid clutch impeller, a driven rotor, a driven shaft, a one-way drive connection between the driven shaft and rotor, said impeller and shaft being permanently connected together through said rotor and one-way drive connection, the impeller and rotor being arranged so that the impeller actuates the rotor only upon relatively high R. P. M., and a clutch having engageable friction disks operable at will for connecting the driven shaft and rotor for eliminating the one-way drive action.

In testimony whereof I affix my signature.

ERNEST E. WEMP.